US010996833B2

(12) United States Patent
Smuga et al.

(10) Patent No.: US 10,996,833 B2
(45) Date of Patent: May 4, 2021

(54) CHROMELESS USER INTERFACE

(71) Applicant: MICROSOFT TECHNOLOGY LICENSING, LLC, Redmond, WA (US)

(72) Inventors: Michael A. Smuga, Seattle, WA (US); Darren A. Apfel, Redmond, WA (US); Jason S. Schneekloth, Redmond, WA (US); Ryan M. Haning, Issaquah, WA (US); Michael J. Kruzeniski, Sausalito, CA (US); Michael K. Henderlight, Sammamish, WA (US); Brian M. Wilson, Mercer Island, WA (US); Paula Guntaur, Seattle, WA (US); Chad A. Voss, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/862,164

(22) Filed: Apr. 29, 2020

(65) Prior Publication Data
US 2020/0326833 A1    Oct. 15, 2020

Related U.S. Application Data

(63) Continuation of application No. 16/522,253, filed on Jul. 25, 2019, now Pat. No. 10,671,256, which is a (Continued)

(51) Int. Cl.
*G06F 3/0484*    (2013.01)
*G06F 3/0482*    (2013.01)
(Continued)

(52) U.S. Cl.
CPC ........ *G06F 3/04842* (2013.01); *G06F 3/0482* (2013.01); *H04M 1/724* (2021.01);
(Continued)

(58) Field of Classification Search
CPC ......... H04M 1/72519; H04M 1/72544; H04M 1/72583; G06F 3/0482
(Continued)

(56) References Cited

U.S. PATENT DOCUMENTS 8,194,115 B2 *   6/2012   Lee ......................... H04N 7/15
                                                        348/14.02
8,365,099 B2 *   1/2013   Cho ....................... G06F 3/0483
                                                        715/863

(Continued)

OTHER PUBLICATIONS

"Office Action Issued in Israel Patent Application No. 255387", dated May 31, 2020, 4 Pages.
(Continued)

*Primary Examiner* — Congvan Tran

(57) ABSTRACT

Techniques are described to implement a user interface for a display of a mobile device. In an implementation, the user interface may include a chromeless menu configured to be displayed when menu-based user input to the mobile device is available; a system tray configured to be displayed on the display when a notice containing status information affecting operability of the mobile device is available; and a task switcher module operable to cause a chromeless overlay be displayed over an active application being executed by the mobile device to allow selection of one or more applications of the mobile device.

20 Claims, 10 Drawing Sheets

Related U.S. Application Data continuation of application No. 15/957,498, filed on Apr. 19, 2018, now Pat. No. 10,394,433, which is a continuation of application No. 14/517,457, filed on Oct. 17, 2014, now Pat. No. 9,977,575, which is a continuation of application No. 13/418,884, filed on Mar. 13, 2012, now Pat. No. 8,914,072, which is a continuation of application No. 12/414,455, filed on Mar. 30, 2009, now Pat. No. 8,175,653.

(51) Int. Cl.
*H04M 1/724* (2021.01)
*H04M 1/72403* (2021.01)
*H04M 1/72427* (2021.01)
*H04M 1/72469* (2021.01)

(52) U.S. Cl.
CPC .... *H04M 1/72403* (2021.01); *H04M 1/72427* (2021.01); *H04M 1/72469* (2021.01)

(58) Field of Classification Search
USPC .... 455/95, 154.2, 457, 550.1; 345/169, 173; 715/761, 828, 841
See application file for complete search history.

(56) References Cited

U.S. PATENT DOCUMENTS

| | | | |
|---|---|---|---|
| 2003/0008686 A1* | 1/2003 | Park | H04M 1/72583 455/566 |
| 2006/0059432 A1 | 3/2006 | Bells | |
| 2007/0113202 A1* | 5/2007 | Byun | H04M 1/72583 715/810 |
| 2008/0010610 A1* | 1/2008 | Lim | H04M 1/72583 715/810 |
| 2009/0298548 A1* | 12/2009 | Kim | H04M 1/72544 455/566 |
| 2010/0053089 A1* | 3/2010 | Kwok | G06F 3/04886 345/173 |

OTHER PUBLICATIONS

"Office Action Issued in Indian Patent Application No. 7065/CHENP/2011", dated Mar. 18, 2019, 07 Pages.

"Office Action Issued in Brazilian Patent Application No. PI1014072-7", dated Aug. 22, 2019, 6 Pages.

* cited by examiner

CHROMELESS USER INTERFACE

RELATED APPLICATIONS

This Application claims the benefit of and priority under 35 U.S.C. Section 120 to U.S. application Ser. No. 16/522,253, filed Jul. 25, 2019, and titled "Chromeless User Interface", which is a continuation of and claims priority to U.S. application Ser. No. 15/957,498, filed Apr. 19, 2018, and titled "Chromeless User Interface", which is a continuation of and claims priority to U.S. application Ser. No. 14/517,457, filed Oct. 10, 2014, and titled "Chromeless User Interface", which is a continuation of and claims priority to U.S. application Ser. No. 13/418,884, filed Mar. 13, 2012, and titled "Chromeless User Interface", which is itself a continuation of U.S. application Ser. No. 12/414,455, filed Mar. 30, 2009, and titled "Chromeless User Interface," the disclosures of each of which are hereby incorporated by reference in their entirety.

BACKGROUND

Mobile devices such as mobile phones including smart phones, wireless phones, and so forth, have become an integral part of everyday life. Communication techniques that may be employed using a mobile device have also increased. For example, users were traditionally limited to telephone calls between mobile communications devices and landline telephones. Advances have been made to provide a variety of other communication techniques, e.g., text messaging, email, social networking, and so forth. However, inclusion of these additional communication techniques on mobile devices having traditional form factors may cause these devices to become unwieldy and less suitable for mobile applications. For example, traditional input devices that were employed by these communication techniques may be less suitable when applied by traditional mobile devices.

SUMMARY

Techniques are described to implement a user interface for a display of a mobile device that is configured to generate a chromeless user experience for the mobile device. In implementations, the user interface may include a menu system configured to be displayed when menu-based user input to the mobile device is available. In additional implementations, the user interface may include a system tray configured to be displayed in response to a notification containing at least one of communication related information or device status information affecting operability of the mobile device. In further implementations, the user interface may include a task switcher operable to display indicia corresponding to one or more non-active tasks running on the mobile device in an overlay superimposed over a user experience of an active task, the task switcher being configured to switch to one of the one or more non-active tasks in response selection of the indicia.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
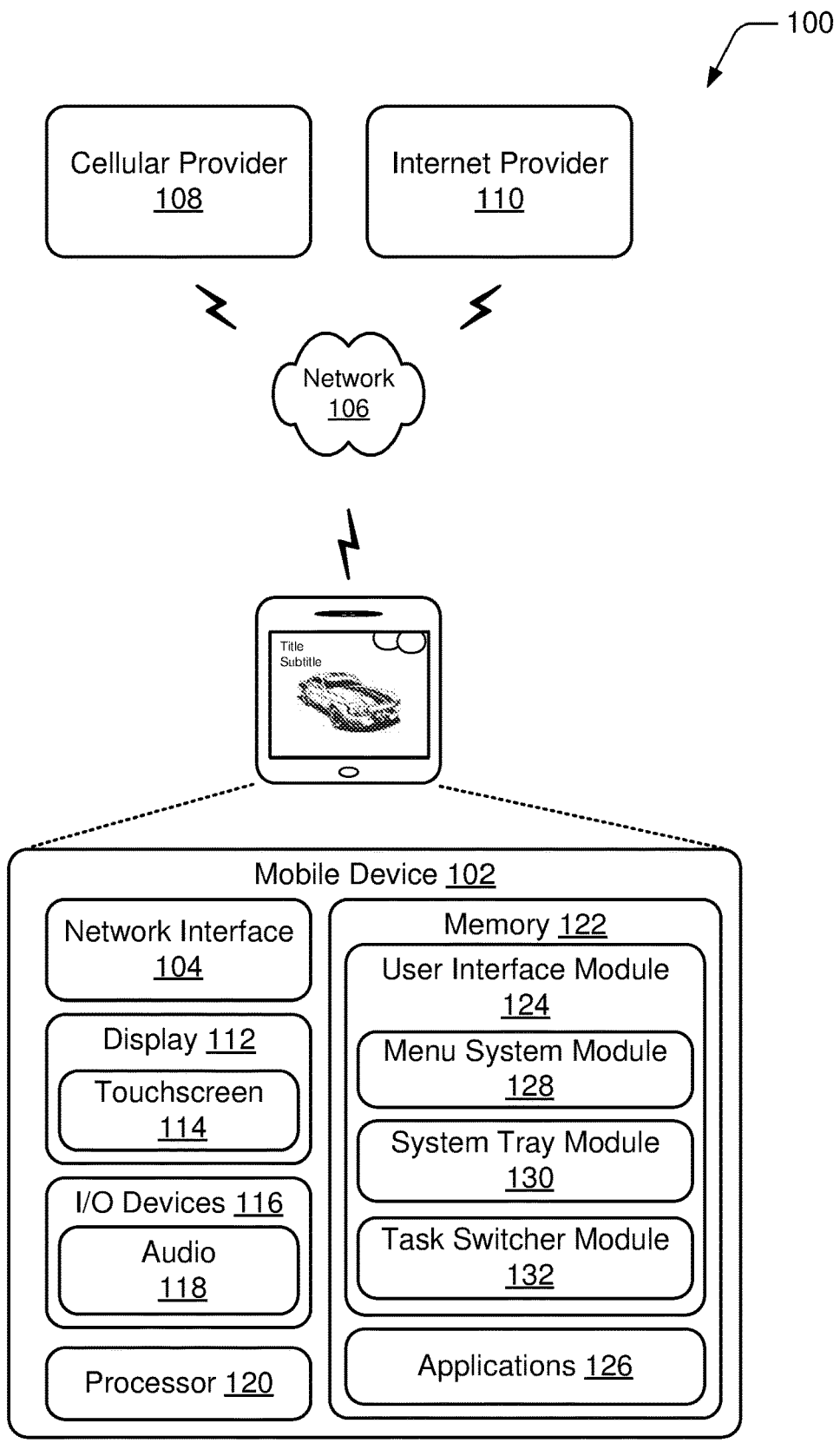
FIG. 1 is an illustration of an example mobile device environment that is operable to generate a user interface.

The functionality provided by mobile devices such mobile phones including smart phones, cell phones, and so forth is ever increasing. Traditionally, mobile devices employed user interfaces that relied heavily on graphical elements such as menu bars, scroll bars, windows, text boxes, and so on to generate the user experience for the mobile device. These graphical elements are referred to as the "chrome" of the user interface.

As the functionality of mobile devices has increased, more complex user interfaces are employed to organize the increasing amount of information presented to the user. These more-complex user interfaces tend to make extensive use of "chrome" elements. However, mobile devices generally have small form factors and typically employ displays that furnish limited space for display of the user interface. Consequently, in complex user interfaces chrome may occupy a substantial amount of the mobile device's display area, making the display appear cluttered and lessening the user experience.

Techniques are described to implement a user interface that is configured to generate a chromeless user experience for a mobile device. In an implementation, an application may be executed that is configured to furnish a user experience for a display of a mobile device such as a mobile phone. The user interface is implemented to cause an application programming interface (API) to be generated to expose functionality to the application to configure the application for chromeless display of the user experience.

In implementations, the user interface may include a variety of features. For instance, in one implementation, the user interface employs a menu system that provides extended functionality to applications running on the mobile device without the use of traditional chrome elements. The menu system employs menu elements that are displayed when menu-base user input is available. The user interface may also include a system tray configured to be displayed in response to a notification containing at least one of communication related information or device status information affecting operability of the mobile device. In embodiments, common device status notifications such as battery status or signal strength may be removed from the user interface until they become important, so that chrome elements are not used to display these notifications.

The user interface may also employ a task switcher operable to display indicia (e.g., thumbnails or icons) corresponding to one or more non-active tasks running on the mobile device in an overlay superimposed over a user experience of an active task. The task switcher is configured to switch to one of the non-active tasks in response selection of the indicia. Still further, the user interface may employ a dashboard configured to access to one or more settings of the mobile device so that common settings such may be readily adjusted. In embodiments, the system tray may comprise one or more launch points for launching tasks. For example, in one embodiment, the system tray may include a task switcher launch point and a dashboard launch point configured to launch the task switcher and dashboard, respectively.

In the following discussion, an example environment is first described that is operable to generate a user interface. Examples of user interfaces are then described that may be employed in the illustrated environment, as well as in other environments without departing from the spirit and scope thereof.

Example Environment

FIG. 1 illustrates an exemplary mobile device environment 100 that is operable to perform the techniques discussed herein. The environment 100 includes a mobile device 102 operable to implement a user interface that generates a chromeless user experience. The mobile device 102 may be configured in a variety of ways. For example, the mobile device 102 may be configured as a mobile communication device such as a smart phone, a cell phone, a personal digital assistant, and so on. The mobile device 102 includes a network interface 104 that may enable the device to communicate with one or more networks, such as network 106 to access service providers such as a cellular provider 108 and an internet provider 110 that provide cellular phone, network connectivity and/or data retrieval functionality to various aspects of the environment.

The network 106 may assume a wide variety of configurations. For example, the network 106 may include a cellular telephone network, the Internet, a wide area network (WAN), a local area network (LAN), a wireless network (e.g., a WIFI (IEEE 802.11) network), a public telephone network, an extranet, an intranet, and so on. Further, although a single network 106 is shown, the network 106 may be configured to include multiple networks. For instance, the mobile device 102, configured as a smart phone, may access a webpage within a corporate intranet via a cellular telephone network. A variety of other instances are also contemplated.

The mobile device 102 also includes a display 112 to display information to the user of the mobile device 102. In embodiments, the display 112 may comprise an LCD (Liquid Crystal Diode) display, a TFT (Thin Film Transistor) LCD display, an LEP (Light Emitting Polymer or PLED (Polymer Light Emitting Diode) display, and so forth, configured to display text and/or graphical information such as a graphical user interface. The display 112 may be backlit via a backlight such that it may be viewed in the dark or other low-light environments. In specific implementations, the display 112 may be provided with a touch screen 114 for entry of data and commands. The mobile device 102 may further include one or more input/output (I/O) devices 116 (e.g., a keypad, buttons, a wireless input device, data input, and so on). The input/output devices 116 may include one or more audio I/O devices 118, such as a microphone, speakers, and so on.

The various devices and modules of the mobile device 102 are communicatively coupled to a processor 120 and memory 122. The processor 120 provides processing functionality for the mobile device 102 and may include any number of processors, micro-controllers, or other processing systems and resident or external memory for storing data and other information accessed or generated by the mobile device 102. The processor 120 may execute one or more software programs which implement the techniques and modules described herein. The processor 120 is not limited by the materials from which it is formed or the processing mechanisms employed therein, and as such, may be implemented via semiconductor(s) and/or transistors (e.g., electronic integrated circuits (ICs)), and so forth.

The memory 122 is an example of computer-readable media that provides storage functionality to store various data associated with the operation of the mobile device 102, such as the software program and code segments mentioned above, or other data to instruct the processor 120 and other elements of the mobile device 102 to perform the techniques described herein. Although a single memory 122 is shown, a wide variety of types and combinations of memory may be employed. The memory 122 may be integral with the processor 120, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the mobile device 102, the memory 122 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

In implementations, the mobile device 102 includes a user interface module 124, which is storable in memory 122 and executable by the processor 120. The user interface module 124 is representative of functionality to generate a user experience that is operable to control the display of information and data to the user of the mobile device 102 via the display 112. The user interface module 124 may also provide functionality to allow the user to interact with one or more applications 126 of the mobile device 102 by providing inputs via the touch screen 114 and/or the I/O devices 116. Applications 126 may comprise software, which is storable in memory 122 and executable by the processor 120 to perform a specific operation or group of operations and/or to furnish a user experience for the mobile device 102. Example applications 126 may include cellular telephone applications, instant messaging applications, browsers, photograph sharing applications, calendar applications, address book applications, and so forth.

In an implementation, an application 126 stored in memory 122 may be executed by the processor 120. The application 126 is configured to furnish a user experience for the mobile device 102. For example, the application 126 may furnish a user experience for display by the display 112 of the mobile device 102, e.g., by providing content to be displayed by the display. The user interface module 126 may cause an application programming interface (API) to be generated to expose functionality to the application 126 to configure the application 126 for chromeless display of the user experience by the display 112. In embodiments, the user interface module 124 may also provide functionality to allow the user to interact with user experience furnished by the application 126 by providing inputs via the touch screen 114 and/or the I/O devices 116. An example user interface 500 that may be implemented by the user interface module 124 to generate a chromeless user experience is described in relation to FIG. 5.

Figure 6A:
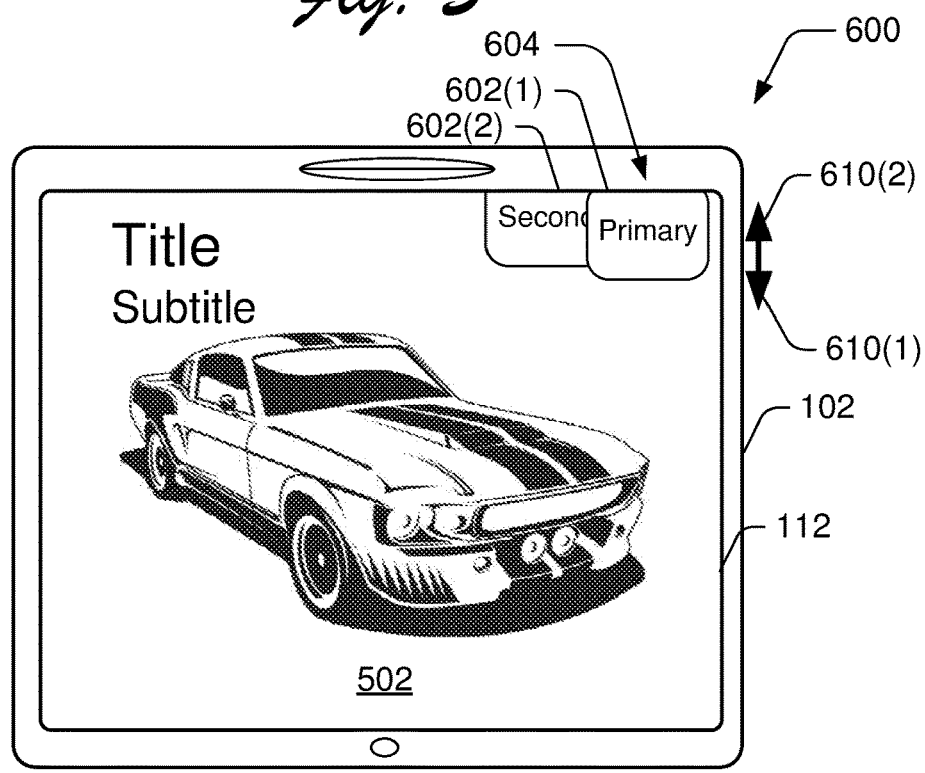
FIG. 6A is an illustration depicting an example top level menu of the menu system of the user interface of FIG. 5.
Figure 6B:
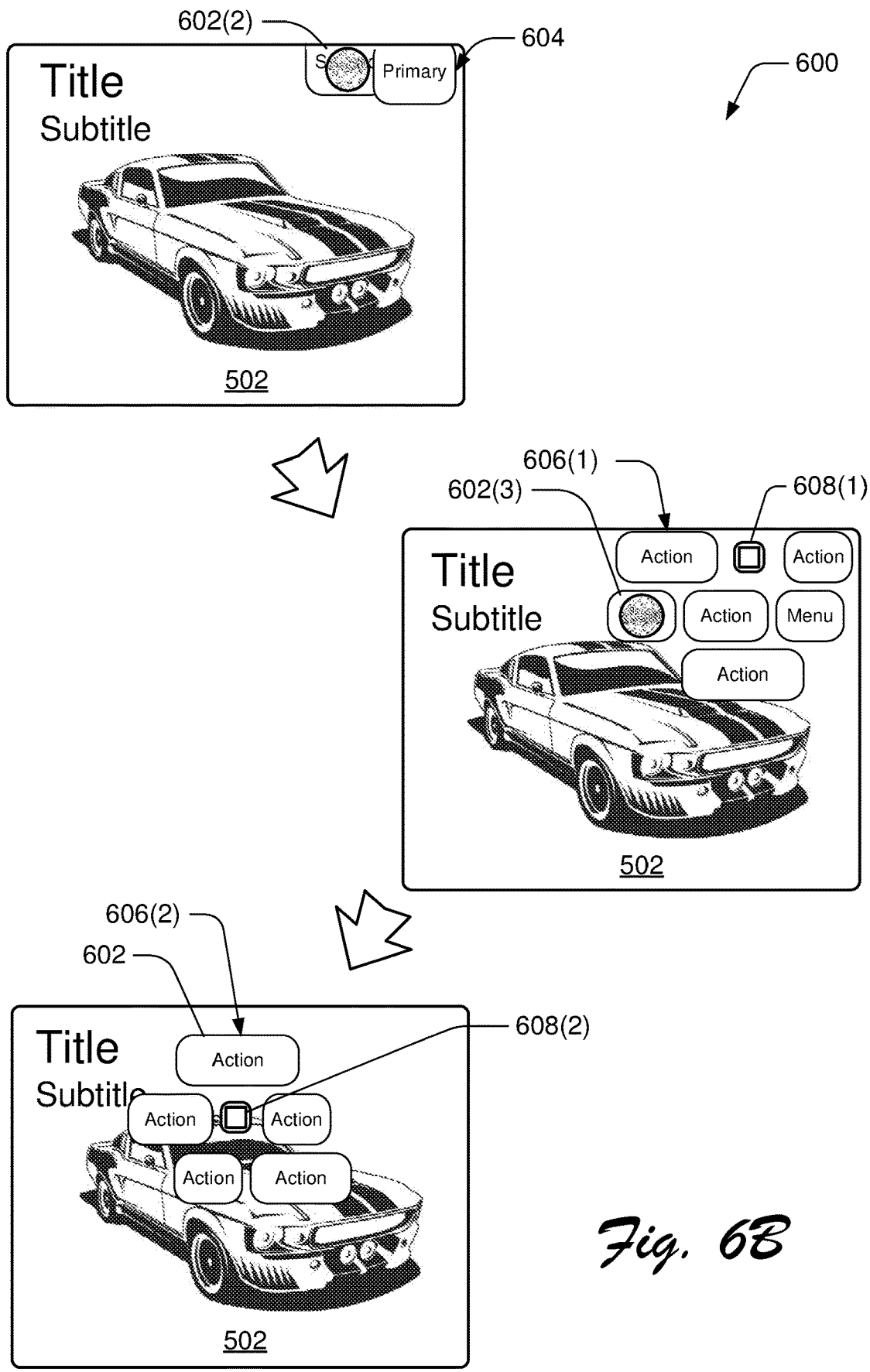
FIG. 6B is an illustration depicting example submenus that may be accessed via a top level menu of the menu system of FIG. 6A.

In implementations, the user interface module 124 may include a menu system module 128, a system tray module 130, and a task switcher module 132. The menu system module 128 is representative of functionality to generate a menu system that provides functionality to user interface module 124 and/or applications 126 executing on the mobile device 102. In embodiments, the menu system does not permanently display chrome elements such as status bars, scroll bars, and so forth. Instead, the menu system may be displayed in response to a determination that a menu-based input is available. Menu-based input may be made to the user interface module 124 or an application 126. In embodiments, the menu system includes menu items that may be selected by a user of the mobile device 102 via the touch screen 114 or an I/O device 116 such as a keypad, a button, and so on. When the menu-based input is not available, the menu system is not displayed. An example procedure 200 that may be employed by the menu system module 128 to generate a menu system is described below in relation to FIG. 2. An example menu system 600 that may be generated by the menu system module 128 is described below in relation to FIGS. 6A and 6B. Example menu items 700 that may be utilized by the menu system 600 of FIGS. 6A and 6B are described in relation to FIG. 7.

The system tray module 130 is representative of functionality to generate a system tray that is configured to provide notifications including communication related notifications and device status notifications to a user of the mobile device 102. In embodiments, the system tray module 130 may cause common device system status notifications such as battery status, signal strength, and so forth, to be removed from the user interface until the status information meets predefined criteria resulting in a determination that the status information is to be furnished to the user. For example, in one embodiment, the system tray module 130 may cause a status notification indicating that low battery life is to be displayed when the battery life of the mobile device 102 falls below a predetermined level. In this manner, chrome elements traditionally employed by user interfaces to provide status information may be removed from the display 112 to reduce display clutter.

The system tray module 130 may also provide functionality to generate launch points for launching various tasks such as elements of the user interface, applications 126, and so forth. For instance, in one embodiment, the system tray module 130 may cause launch points to be generated within the user interface to launch a dashboard to display settings used for operation of the mobile device 102, operational status notification (e.g., low battery life, low signal strength, etc.), and so forth. An example system tray 800 that may be generated by the system tray module 130 is described in relation to FIGS. 8A, 8B and 8C. An example dashboard that may be launched from the system tray 800 is described in relation to FIG. 9.

The task switcher module 132 is representative of functionality to generate a task switcher. In embodiments, the task switcher may be accessed via a single user interaction to navigate among two or more tasks (e.g., an application 126) supported by the mobile device 102. For instance, the task switcher module 132 may be configured to cause an overlay to be displayed over a user experience of an active task, e.g., an application 126 being executed by the processor 120 of the mobile device 102 causing information to be displayed by the display 112. The overlay may include indicia (e.g., thumbnails or icons) corresponding to one or more non-active tasks running on the mobile device 102 so that a user may switch to one of the one or more non-active tasks in response selection of one of the indicia. An example task switcher 1000 is described in relation to FIG. 10.

Generally, any of the functions described herein may be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the module represents executable instructions that perform specified tasks when executed on a processor, such as the processor 120 of the mobile device 102 of FIG. 1. The program code may be stored in one or more tangible computer readable media, an example of which is the memory 122 of the mobile device 102 of FIG. 1. The features of the user interface generation techniques described below are platform-independent, meaning that the techniques may be implemented on a variety of commercial computing platforms having a variety of processors.

Example Procedures

The following discussion describes user interface configuration and generation techniques that may be implemented utilizing the previously described systems and devices. Aspects of each of the procedures may be implemented in hardware, firmware, software or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and/or other example embodiments.

Figure 2:
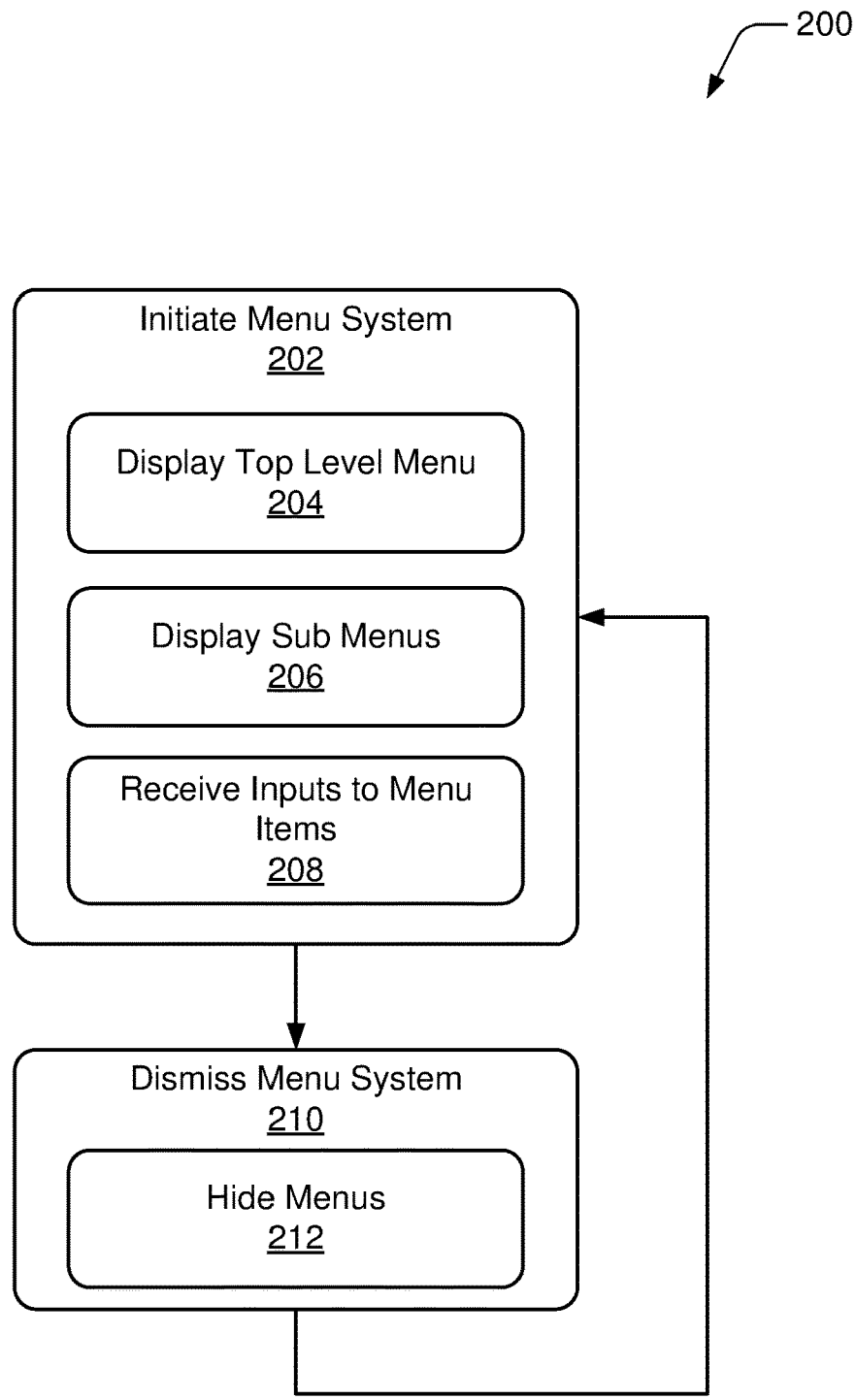
FIG. 2 is a flow diagram depicting a procedure in an example implementation in which a menu system may be generated by the user interface of the mobile device of FIG. 1.

FIG. 2 illustrates a procedure 200 in an example implementation in which a menu system may be generated by a user interface configured to provide a chromeless user experience. In implementations, the menu system may be initiated when menu-based user input is available (block 202). Menu-based user input is an input made by a user of the mobile device 102 utilizing the menu system. In embodiments, menu-based input is available when the user interface of the mobile device is configured to receive input from a user via the menu system. For instance, the menu system may be initiated by the user interface to accept input of information, to enter a setting for the mobile device, to select a user interface option, to receive an input to a generated prompt, and so forth.

The menu system may also be initiated when menu-based input is requested by an application of the mobile device to select an option of the application, to enter information in response to a prompt generated by the application, to set one or more settings of the application, and so forth. In implementations, when the menu system is initiated (block 202), a top level menu is first displayed (block 204). Multiple top level menus may be provided. Each top level menu may include one or more menu items that may be selected by the user of the mobile device.

One or more submenus may also be displayed (block 206). For instance, a submenu may be accessed through a top level menu. Submenus may also be nested beneath a top level menu so that they may be accessed through other submenus. Menu-based inputs may be received through the menu system via selection of one or more menu items of a top level menu or a submenu (block 208). When menu based input is no longer available, the menu system may be dismissed (block 210) so that menus of the menu system (e.g., the top level menu and/or any displayed sub-menus) are hidden (block 212) until menu based input is again available (block 202).

Figure 3:
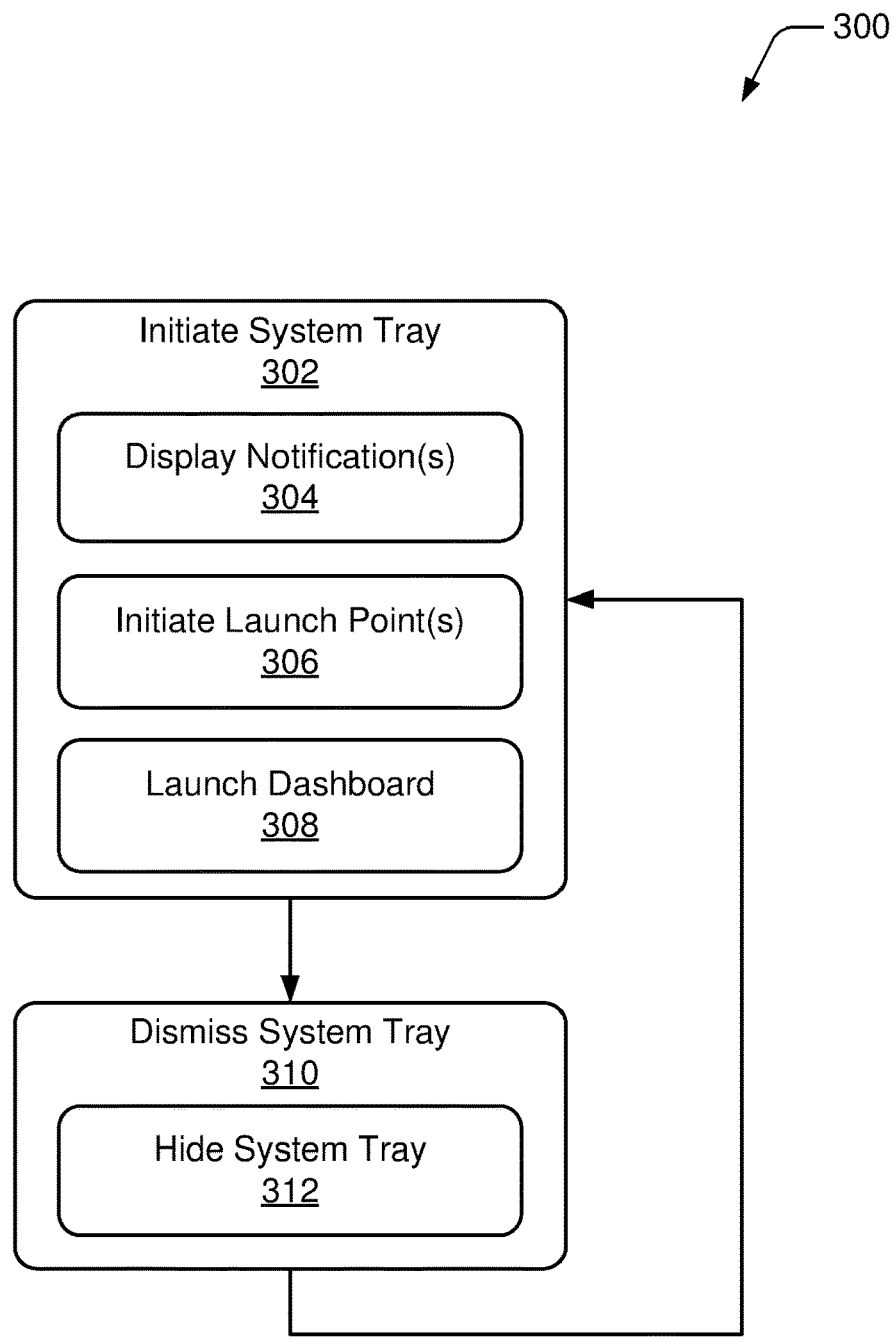
FIG. 3 is a flow diagram depicting a procedure in an example implementation in which a system tray may be generated by the user interface of the mobile device of FIG. 1.

FIG. 3 depicts a procedure 300 in an example implementation in which a system tray may be generated by a user interface configured to provide a chromeless user experience. In implementations, the system tray may be initiated (block 302) when a request to initiate the system tray is received. In embodiments, a request to initiate the system tray may be made by a variety of sources. For example, the system tray may be initiated to display notifications such as notification of communication related information or device status information (block 304) by the user interface. The system tray may also be initiated to furnish launch points for launching various tasks of the user interface (e.g., the task switcher), applications 126, and so forth (block 306).

In embodiments, the system tray may also be initiated to provide an interface to launch a dashboard to display settings used for operation of the mobile device, operational status notification (e.g., low battery life, low signal strength, etc.) and so forth (block 308). When the system tray is no longer used, the system tray may be dismissed (block 310) so that the system tray is hidden (block 312) until it is again initiated (block 302).

Figure 4:
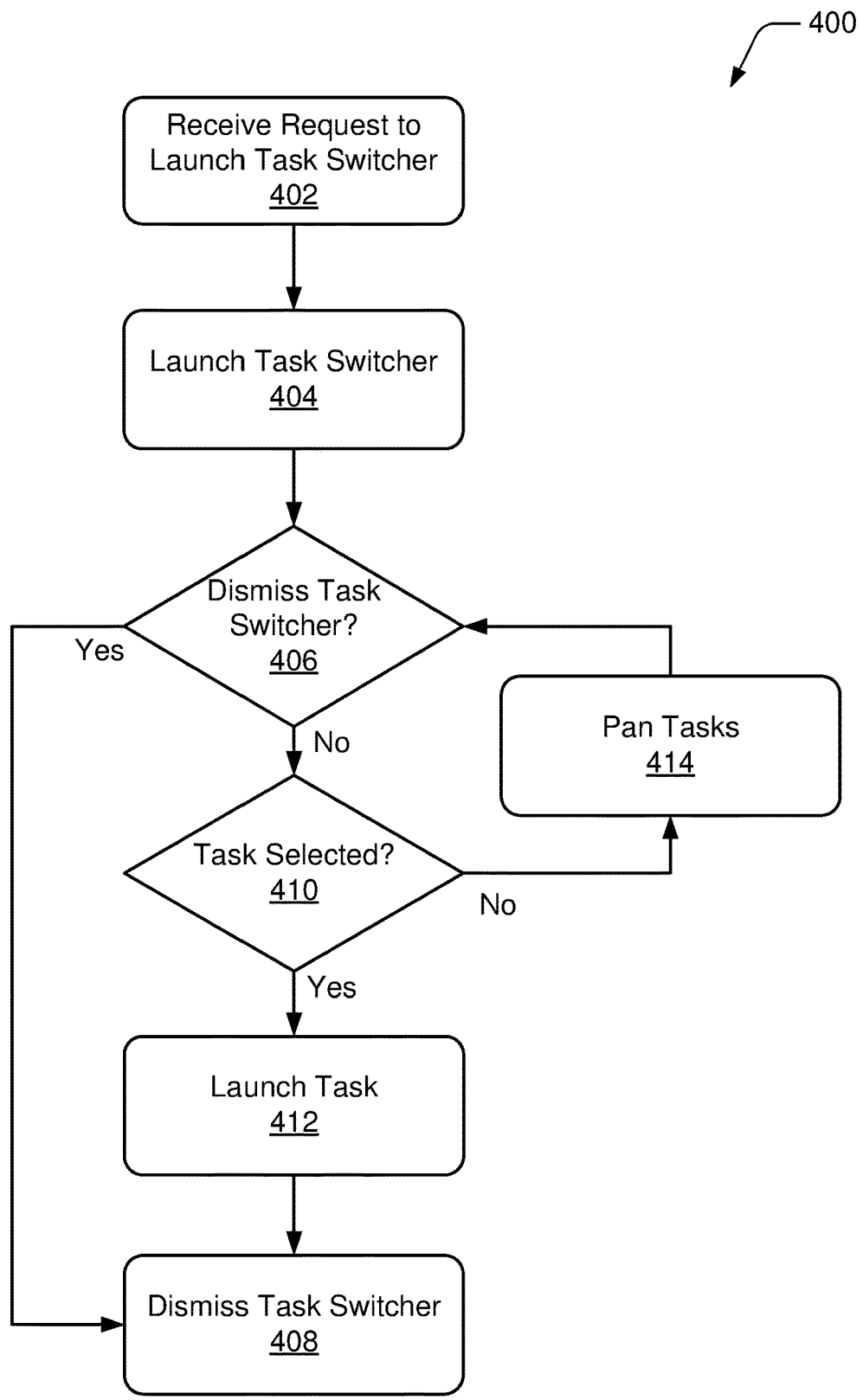
FIG. 4 is a flow diagram depicting a procedure in an example implementation in which a chromeless task switcher may be generated by the user interface of the mobile device of FIG. 1.

FIG. 4 depicts a procedure 400 in an example implementation in which a chromeless task switcher may be generated by a user interface configured to provide a chromeless user experience. As illustrated, a request may be received to launch the task switcher (block 402). In implementations, a request to launch the task switcher may be received through a user interaction with the mobile device implementing the user interface. For example, a request to launch the task switcher may comprise a user input made to a launch point of the system tray described above in relation to FIG. 2. However, the task switcher may be launched in other ways, such as by a voice command, selection of a button or key, and so forth.

The task switcher may then be launched (block 404). In embodiments, the task switcher may comprise an overlay that is displayed over the user experience of an active task (e.g., an application 126 being executed by the processor 120 of the mobile device 102 shown in FIG. 1). The overlay may include one or more indicia (e.g., thumbnails, icons, etc) indicating other currently running tasks (e.g., applications, notifications, etc.) that may be accessed. In embodiments, the task switcher may remain open until dismissed by the user of the mobile device. For example, a determination may be made whether the task switcher is to be dismissed (decision block 406). If a determination is made that the task switcher is to be dismissed ("yes" from decision block 406), the task switcher is dismissed (block 408) so that the overlay is no longer displayed. Otherwise, a determination is made that the task switcher is not to be dismissed ("no" from decision block 406).

A determination is then made whether a task has been selected (decision block 410). When a task is selected by the user ("yes" from decision block 410), the task may be launched (block 412) and the task switcher dismissed (block 408). In embodiments, when a task is not selected ("no" from decision block 410), the task switcher may allow the user to pan through the indicia indicating other currently running tasks (block 414) until a task may be selected and launched (block 412) or the task switcher dismissed (block 408) by the user without a selection being made. In some embodiments, the task switcher may also be timed out and dismissed (block 408) when no input is received within a predetermined duration of time.

Example User Interfaces

This section presents elements of a user interface that may be generated using the processes and techniques discussed herein to provide a chromeless user experience. Aspects of the user interface may be generated in hardware, firmware, software or a combination thereof. In portions of the following discussion, reference will be made to the environment 100 of FIG. 1, and the procedures 200, 300 and 400 of FIGS. 2, 3, and 4, respectively, and/or other example environments and procedures.

Figure 5:
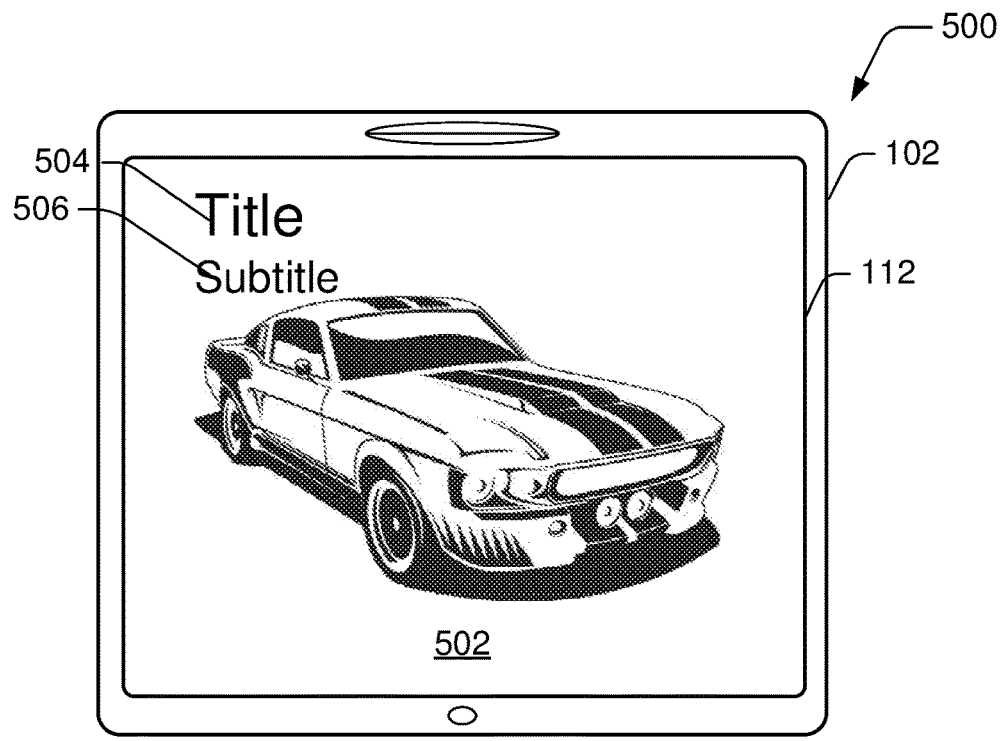
FIG. 5 is an illustration depicting a user interface that may be employed by a mobile device such as the mobile device of FIG. 1.
Figure 8A:
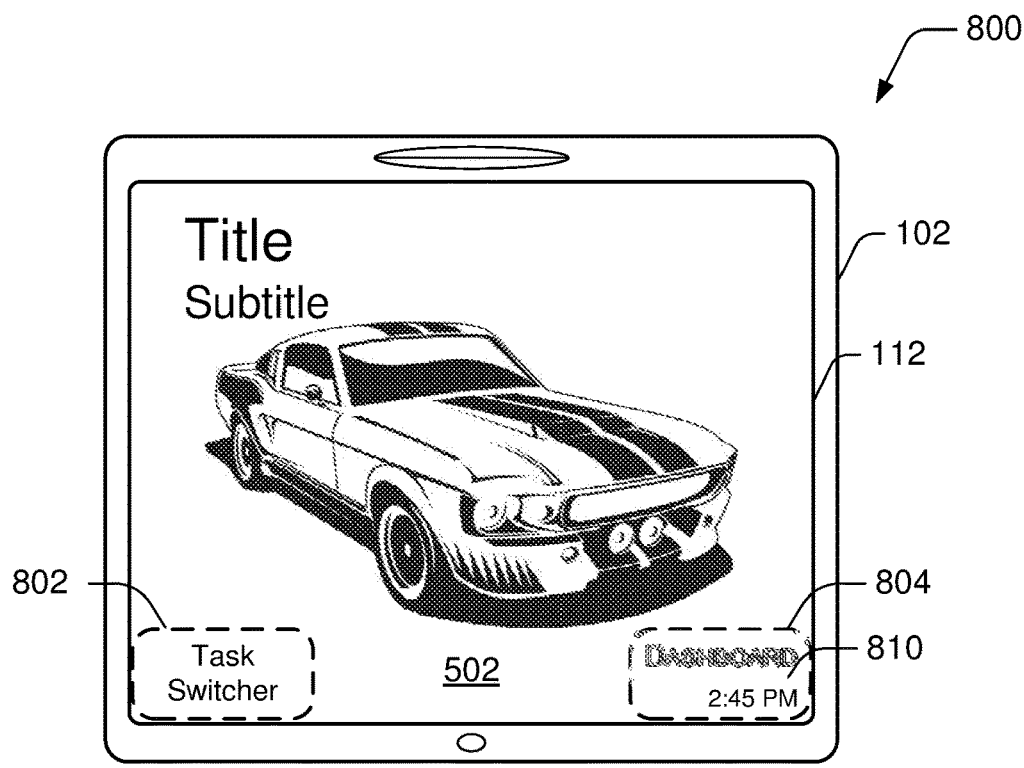
FIG. 8A is an illustration depicting an example system tray that may be employed by the user interface of FIG. 5.
Figure 8B:
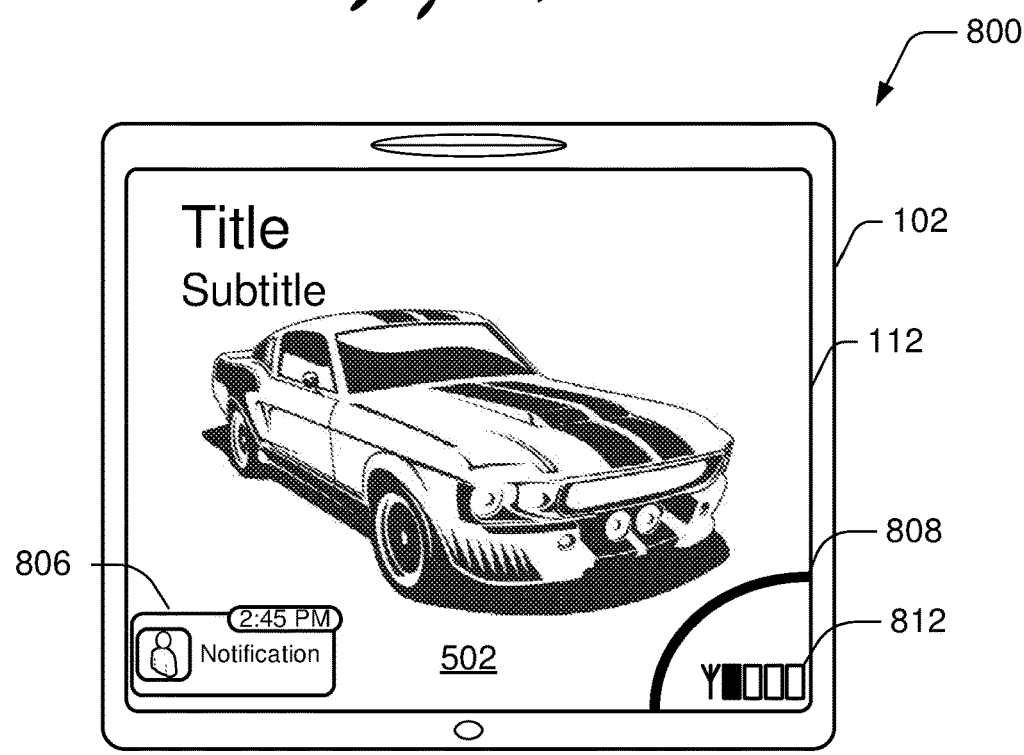
FIG. 8B is an illustration depicting the example system tray of FIG. 8A, further illustrating the display of communication related notifications and device status notifications by the status tray.
Figure 8C:
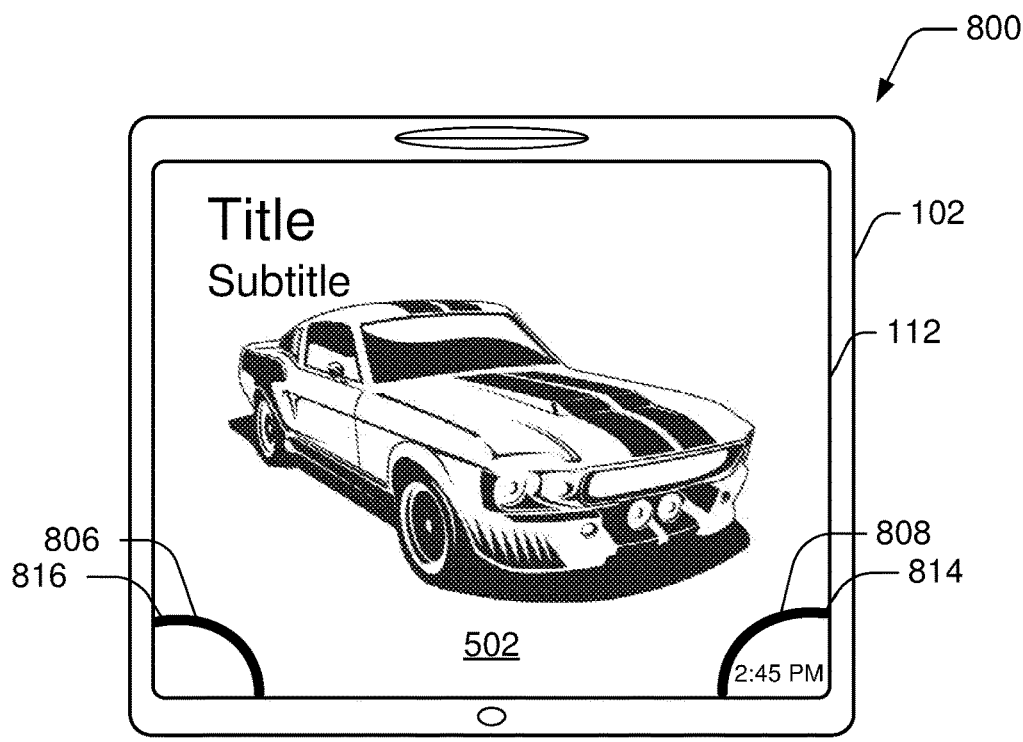
FIG. 8C is an illustration depicting the example system tray of FIGS. 8A and 8B, further illustrating communication related notifications and device status notifications that have been minimized within the system tray.

FIG. 5 illustrates a user interface 500 that may be employed by a mobile device such as the mobile device 102 of FIG. 1 to provide a chromeless user experience. During various operational modes, the user interface 500 is configured to provide a chromeless user experience 502 by displaying content from applications of the mobile device 102 without the use of traditional chrome elements such as such as menu bars, scroll bars, windows, text boxes, and so forth. Interaction with applications supported by the mobile device 102 is provided via a menu system 600 (FIGS. 6A and 6B) and a system tray 800 (FIGS. 8A, 8B, and 8C). A task switcher 1000 (FIG. 10) facilitates switching between applications running on the mobile device.

The user interface 500 may include text and/or graphics that provide context to the user experience 502. For instance, in the embodiment illustrated, the user interface includes a title 504 and subtitle 506 that are configured to identify the particular application accessed and/or to provide context to the content of the user experience 502 displayed by the application. Thus, a photo sharing application might include the title "Photos" and the subtitle "Summer Vacation— 2008" to provide context photos displayed by the photo sharing application, while a cellular telephone application might include the title "Phone" and the subtitle "Call Log"

to provide context to information displayed by the cellular telephone call log application. Other examples are contemplated.

FIGS. 6A and 6B illustrate an example menu system 600 that may be employed by the user interface 500 shown in FIG. 5. The menu system 600 makes use of menu items 602 that may be superimposed over the user experience 502 of the mobile device 102. In embodiments, the menu items 602 may be arranged into top level menus 604, an example of which is illustrated in FIG. 6A, and submenus 606, an example of which is illustrated in FIG. 6B.

FIG. 6A illustrates an example top level menu 604 of the menu system 600. The top level menu 604 as illustrated may include one or two menu items 602 depending on the number of initial options to be presented to the user. Where two menu items 602 are provided, the menu items 602 may be configured as a primary menu item 602(1) and a secondary menu item 602(2). In the embodiment illustrated, the primary and second menu items 602(1) & 602(2) are shown as overlapping one another with the primary menu item 602(1) displayed so that it appears to be in front of the secondary menu item 602(2). Additionally, the primary menu item 602(1) may extend farther into the user experience 502 (e.g., lower with respect to the top edge of the display 112 on which the user interface 500 (FIG. 5) is displayed) than the secondary menu item 602(2). The tops of both the primary and secondary menu items 602(1) & 602(2) may be clipped so that the menu items 602 appear to extend beyond the edge of the display 112.

Submenus 606 may be employed to display menu items 602 that are not displayed in a top level menu 604. FIG. 6B illustrates example submenus 606 that may be accessed via a top level menu 604 of the menu system 600. Unlike top level menus 604, submenus 606 may be configured to display more than two menu items 602 (although it is contemplated that a submenu 606 may configured to display no more than one or two menu items 602). In implementations, submenus 606 may be accessed via selection of a menu item 602 within a top level menu 604 that is configured to act as access point to the submenu 606. When a menu item 602 configured to access a submenu 606 is selected, the top level menu 604 containing the selected menu item 602 is hidden and the submenu 606 is displayed. The menu items 602 of the submenu 606 may be arranged in a pseudo-radial fashion around a central point ("satellite") 608 that is anchored at the initial location of the selected menu item 602 of the top level menu 604.

In implementations, multiple submenus 606 may be nested in levels beneath a top level menu 604. Thus, menu items 602 within some submenus 606(2) may be accessed by navigating (e.g., "drilling down") from a top level menu 604 through other, intermediate submenus 606(1). For example, as illustrated in FIG. 6B, the selection of the secondary menu item 602(2) of a top level menu 604 may cause a first submenu 606(1) to be displayed. The first submenu 606(1) may include a submenu item 602(3) that is configured to provide access to a second submenu 606(2) when selected.

The menu items 602 of each of the submenus 606(1) & 606(2) are clustered around satellites 608(1) & 608(2) anchored at the initial location of the menu item (e.g., secondary menu item 602(2) and submenu item 602(3), respectively) that was selected to cause display of the submenu 606(1) & 606(2). As nested submenus 606(1) & 606(2) are traversed, the satellites 608(1) & 608(2) within the submenus 606(1) & 606(2) may be selected to return to a higher level submenu 608(1) or a top level menu 604, respectively. For instance, in the embodiment shown in FIG. 6B, the satellite 608(2) of the second submenu 606(2) may be selected to hide the second submenu 606(2) and display the first submenu 606(1). Similarly, the satellite 608(1) of the first submenu 606(1) may be selected to cause the first submenu 606(1) to be hidden and the top level menu 604 to be displayed.

Navigation from a submenu such as the second submenu 606(2) directly to a top level menu 604, while bypassing intermediate level submenus such as submenu 606(1), may also be supported. For instance, selection of a point outside of a submenu 606 may cause the submenu 606 to be hidden and the top level menu 604 to be displayed. In other embodiments, a satellite 608 may be selected and held for a duration of time to return directly to a top level menu 604. Similarly, submenus 606 within the menu system 600 may include indicia such as a "back button" that is configured to provide navigation directly to a top level menu 604 from the submenu 606 when selected.

In implementations, the menu system 600 of FIGS. 6A and 6B may be animated. For instance, as shown in FIG. 6A, when a top level menu 604 is displayed, the menu items 602 of the top level menu 604 may appear to "slide down" from the top edge of the display 112 over the user experience 502 (as indicated by down arrow 610(1)). Similarly, when top level menus 604 are hidden, the menu items 602 of the top level menus 604 may appear to "slide up" to the top edge and off of the display 112 (as indicated by up arrow 610(2)). Display of submenus 606 may also be animated. For example, a submenu 606 may appear to "fly" from the satellite 608 in a pseudo-radial fashion when initiated. Similarly, selection of a satellite 608 may cause a displayed submenu 606 to "shrink" into the satellite 608, while transitioning to a higher level submenu 606 or a top level menu 604.

In FIGS. 6A and 6B, the menu items 602 illustrated are shown as generic blocks for purposes of explanation. However, it is contemplated example menu systems 600 may employ menu items 602 having a variety of shapes, colors, text styles, and so forth. For instance, in one embodiment, the menu items 602 employed by a menu system 600 may share a generally common shape such as an oval, a circle, a box, a speech bubble, and so forth. In other embodiments, menu items 602 employed by the menu system 600 may be provided with a variety of distinct shapes that allow a user to readily identify the function and/or content of each menu item 602. The menu items 602 may be auto-sized according to the text and/or graphics to be displayed.

Menu items 602 may further have a variety of visual states. In one embodiment, menu items 602 may have a normal state, a selected ("tapped") state, and a disabled state. In this embodiment, the normal state of a menu item 602 is the visual state of the item 602 when it is displayed in the menu system 600. The tapped state of a menu item 602 is the visual state of the item 602 that occurs when a user selects ("taps") the menu item 602. For example, a menu item 602 may enter the tapped state for a prescribed duration of time when selected to allow the user to recognize that the menu item 602 was selected. After selection, the menu item 602 may then return to the normal state or be placed in the disabled state. The disabled state of a menu item 602 is used to indicate that the menu item 602 is not a valid selection in a particular context. For example, a menu item 602 in a disabled state may be hidden so that it is not available for selection.

In embodiments, the menu system 600 may include different menu item types. For example, the menu system 600 may include action menu items, toggle menu items, submenu selection menu items, and so forth. Action menu items are used to indicate a particular action that a user can take. In embodiments, action menu items may be identified by a verb (e.g., "Display" or "Dismiss") to indicate the action performed in response to selection of the menu item 602. In some instances, a submenu 606 containing the action menu item may be dismissed upon selection of the menu item 602 so that the action may be performed.

Figure 7:
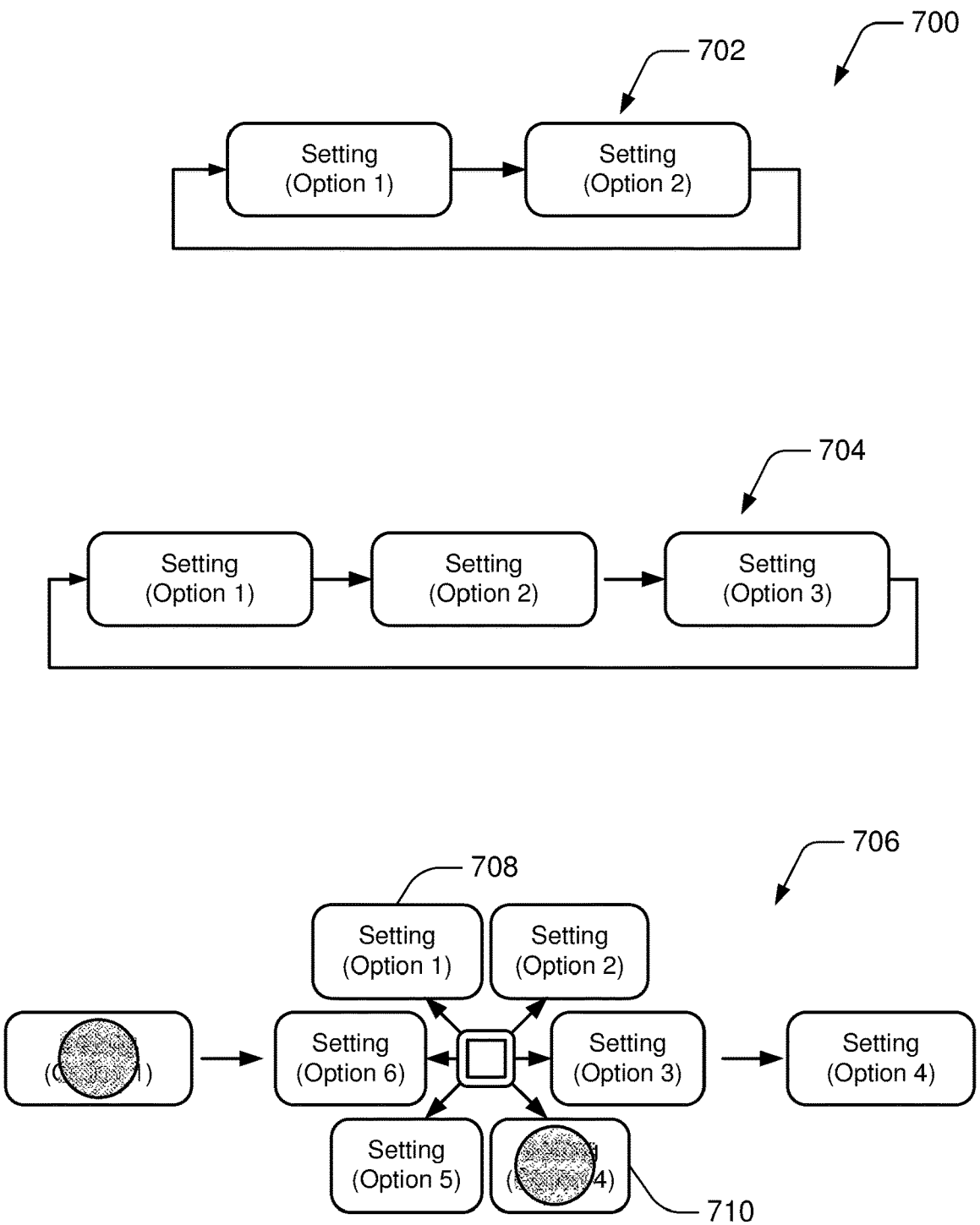
FIG. 7 is an illustration depicting the functionality of various toggle menu items that may be employed by the menu system of FIGS. 6A and 6B.

Toggle menu items toggle between two or more options, for example, to select a setting within an application. FIG. 7 illustrates the functionality of various toggle menu items 700 that may be employed by the menu system 600 shown in FIGS. 6A and 6B. Toggle menu items 700 may include dual toggle menu items 702, tri-toggle menu items 704, and multi-toggle menu items 706. Dual-toggle menu items 702 toggle between two option states. For example, a dual toggle menu item 702 may be utilized to turn a feature (e.g., a wireless transmitter) on or off. Tri-toggle menu items 704 toggle between three option states. In this manner, each time the toggle menu item is selected, the value of the setting is changed. For example, a tri-toggle menu item 704 may be used to adjust the size of an element (e.g., text size) between small, medium, and large sizes. In embodiments, the setting adjusted by the dual-toggle and tri-toggle menu items 702 & 704 and the current state of the setting may be identified by indicia (e.g., text, graphics, and so forth) within the menu item 702 & 704.

Multi-toggle menu items 706 toggle between four or more option states. In embodiments, the setting adjusted by a multi-toggle menu item 706 and the current state of the setting may be identified by indicia (e.g., text, graphics, and so forth) within the menu item 706. Selection of a multi-toggle menu item 706 causes a submenu 708 to be displayed. The submenu 708 includes four or more menu items 710 that correspond to the valid options for the setting. Thus, an option may be set by selecting one of the menu items 710 of the submenu 708. After the option is selected, the submenu 708 may be dismissed and the multi-toggle menu item 706 again displayed.

FIGS. 8A, 8B, and 8C illustrate an example system tray 800 that may be employed by the user interface 500 shown in FIG. 5. The system tray 800 displays device status information and holds notifications such as notifications from recently used applications, notifications of recently missed communications, and so forth.

In example implementations, the system tray 800 may be devoid of chrome elements, and may remain hidden from the user until an event occurs that is deemed by an application and/or the user interface 500 to merit the user's attention. For example, the system tray 800 may be hidden during full screen notifications, during an active phone call, while the dashboard 900 (FIG. 9) is active, while the task switcher 1000 (FIG. 10) is active, while taking a photograph, while watching a full screen video, while viewing a full screen photo, while playing a game, and so on. However, when displayed, the system tray 800 may comprise a persistent user experience that is overlaid on top of other user experience content. As shown, the system tray 800 utilizes the bottom left and bottom right corners of the display to display information and host launch points into the dashboard 900 (FIG. 9) and the task switcher 1000 (FIG. 10).

In implementations, the system tray 800 may be comprised of a task switcher launch point 802 and a dashboard launch point 804. The task switcher launch point 802 may be located in the bottom left corner of the display 112. In embodiments, the task switcher launch point 802 allows the task switcher to be selected via a single tap gesture. Further, when multiple tasks are available, the task switcher launch point 802 may be configured to display an icon representing the most recent task accessed by the user (as identified by the task switcher). As the user changes to a new task using the task switcher, this icon may be updated to reflect the changes made within the task switcher.

As shown in FIG. 8B, the task switcher launch point 802 may also host incoming communication related notifications 806 such as phone calls, emails, instant messages (e.g., SMS/MMS/IM), and so forth, which are dismissed (not read), or for which the maximized state the notification has timed out causing the notification to be minimized or hidden. Additionally, during phone calls, the task switcher launch point 802 may provide in-call notifications such as call waiting notifications, missed call notifications, voice mail notifications, email notifications, and so forth. Similarly, the task switcher launch point 802 may display a persistent icon if a phone call user experience is minimized in order to access another application, such as when the phone call is put on hold. In embodiments, this icon may include the time that the call has been active.

As illustrated, the dashboard launch point 804 may be located in the bottom right corner of the display 112. The dashboard launch point 804 allows a dashboard (such as the dashboard 900 of FIG. 9 discussed below) to be launched via a input by the user, such as a single tap gesture. The dashboard launch point 804 may also be configured to host device status notifications 808 that are determined to be important to the user by the user interface. In implementations, the dashboard launch point 804 may include a clock 810 that is displayed when no device status notifications 808 are present. However, when a device status notification 808 is available, the notification 808 may be displayed in place of or in addition to the clock 810. The dashboard launch point 804 may further display an indication indicating signal strength 812 during phone calls.

In example embodiments, communication related notifications 806 and device status notifications 808 may have at least two states: minimized and maximized. In embodiments, a device status notification 808 is displayed in either the maximized or minimized states while the status condition that triggered the notification 808 exists. For example, when a device status notification 808 is first displayed, the notification 808 is furnished in the maximized state so that the notification 808 may be viewed by the user. After a duration of time (e.g., 3 seconds), the device status notification 808 may transition to the minimized state. FIGS. 6B and 6C illustrate a device status notification 808 in a maximized state (FIG. 6B) and a minimized state (FIG. 6C).

Figure 9:
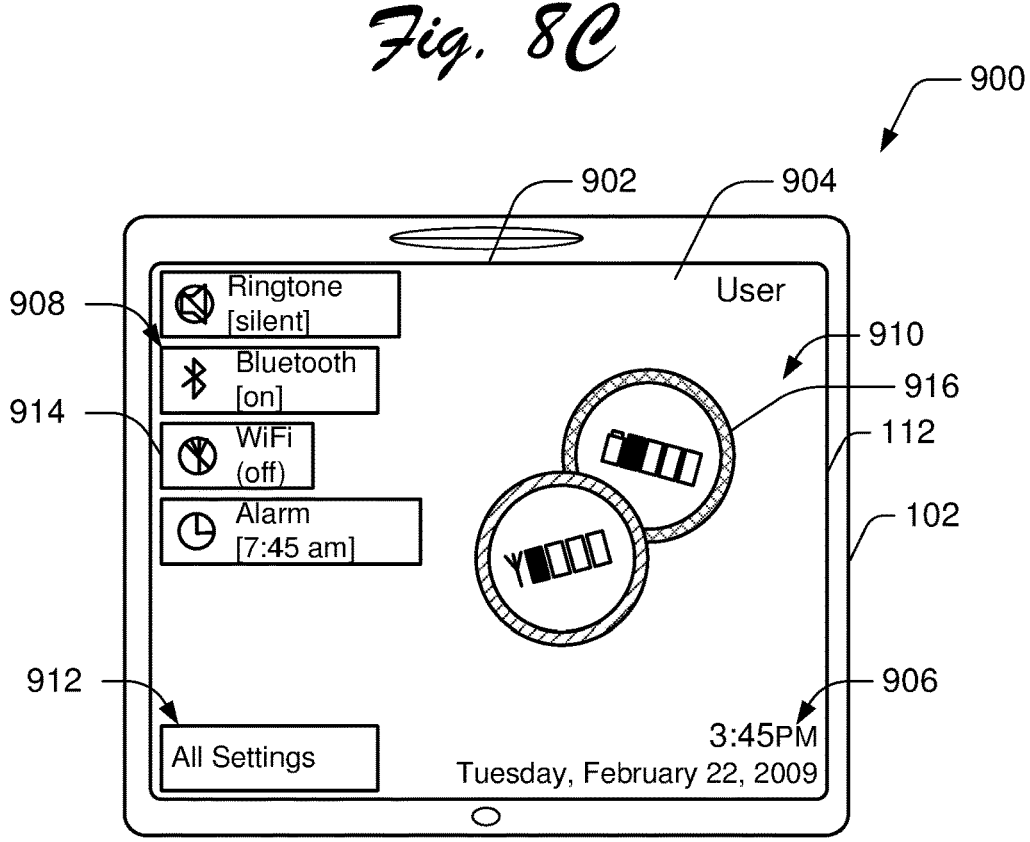
FIG. 9 is an illustration depicting an example dashboard that may be launched from the dashboard launch point of the system tray of FIGS. 8A, 8B, and 8C.
Figure 10:
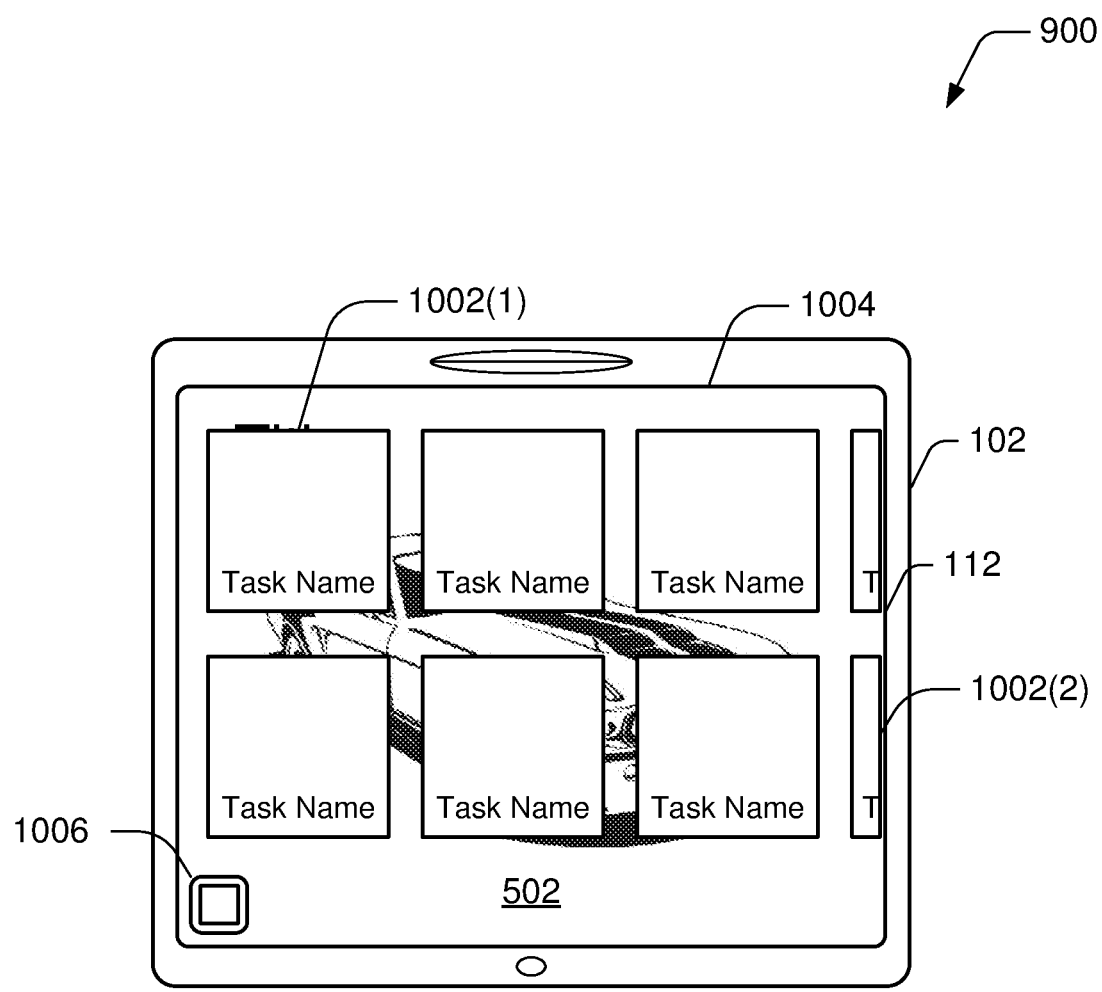
FIG. 10 is an illustration depicting an example chromeless task switcher that may be launched from the task switcher launch point of the system tray of FIGS. 8A, 8B, and 8C.

In implementations, a user may select a device status notification 808 while the notification 808 is in the maximized state to launch a dashboard (e.g., dashboard 900 (FIG. 9). After returning from the dashboard, the device status notification 808 may thereafter be displayed in a minimized state. In the minimized state, the device status notification is not viewable by the user. Instead, indicia (e.g., ring shaped icon 814 shown in FIG. 8C) may be displayed within the dashboard launch point 804 to indicate that a minimized device status notification 808 is present. The user may select the indicia 816 to launch the device status notification 808 in the maximized state. Similar indicia (e.g., ring shaped icon 816 in FIG. 8C) may be used to display communication related notifications 806 in a minimized state.

FIG. 9 illustrates an example dashboard 900 that may be launched from the dashboard launch point 804 of the system tray 800 shown in FIGS. 8A, 8B, and 8C. The dashboard 900 provides functionality to toggle frequently used settings for the mobile device 102, obtain information about a device status, enter a settings area or menu for the device, and so forth. In implementations, the dashboard 900 may comprise an overlay 902 that is displayed by the display 112 of the mobile device 102 in place of the user experience of the device when the dashboard 900 is launched.

As shown in FIG. 9, the overlay 902 may be divided into areas that provide a variety of information describing the operation of the mobile device. In the embodiment illustrated, the overlay 902 may include an operator information/roaming status area 904, a current date/time area 906, settings quick toggle area 908, a device status area 910, and an advanced settings launch point area 912. The operator information/roaming status area 904 identifies the operator (e.g., an owner or user) of the mobile device 102 and may provide information describing the roaming status of the device 102. The current date/time area 906 displays a current date and time. The settings quick toggle area 908 contains a bank of tabs 914 describing settings (e.g., "Ringtone," "Bluetooth," "Wi-Fi," and "Alarm") that can be toggled (e.g., on/off) and displays status information about the settings (e.g., "silent," "on," "off," "7:45 am," respectively).

The device status area 910 provides information about the status of the mobile device 106 such as battery life, wireless signal strength, and so forth. In embodiments, the device status area 910 may display status notifications via one or more graphical elements. For example, in the embodiment shown, icons 916 that are generated to give the impression of "stickers" are used to display status information for the mobile device 102. The icons 916 may be formatted to provide information about the status notification. The advanced settings launch point area 912 furnishes access a detailed settings page that allows adjustment of settings not provided by dashboard 900.

FIG. 10 illustrates an example task switcher 1000 that may be launched from the task switcher launch point 802 of the system tray 800 shown in FIGS. 8A, 8B, and 8C. The task switcher 1000 allows the active task running on the mobile device 102 (e.g., the task providing a user experience including content displayed by the display 112) to be changed or switched with another task that is running but not active. The task switcher 1000 may also function as an entry point for displaying dismissed messages (e.g., instant messages, electronic messages, voicemail notifications, and so forth).

In embodiments, the task switcher 1000 may be configured to display indicia such as thumbnails 1002 corresponding to non-active (e.g., minimized or hidden) tasks running on the mobile device 102 in a translucent overlay 1004 superimposed the then current user experience 502 (e.g., the user experience 502 of an active task). A user may interact with the task switcher 1000 in a variety of ways. For example, the user can select a task by selecting a thumbnail 1002 corresponding to the task. The user may pan through thumbnails 1002 provided via the overlay 1004. In instances where more thumbnails 1002 are available than are be displayed, thumbnails may be scrolled onto and off of the overlay 1004. For example, as shown in FIG. 10, the overlay 1004 may be configured to display a limited number of thumbnails 1002(1) at a given time.

Additional thumbnails 1002(2) that are not displayed but which are available for selection by the user may appear to be partially hidden under an edge of the overlay 1004. A user may then pan through the displayed thumbnails 1002(1) to cause one or more of the additional thumbnails 1002(2) to be scrolled onto the display while one or more of the originally displayed thumbnails 1002(1) are scrolled off of the display and hidden. If a new task is not selected, the user may exit the task switcher 1000 and return to the task that was running when the switcher 1000 was launched by selecting a back button 1006. The task switcher 1000 may also time out and be dismissed and hidden automatically after a period of inactivity. For example, the task switcher may be hidden after 5 seconds have elapsed if the user has provided no input such as panning through the thumbnails 1002 or selecting a thumbnail 1002.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    executing an application configured to furnish a user experience for a display by a mobile device; and
    implementing a user interface configured to cause an application programming interface (API) to be generated to expose functionality to the application to configure the application for chromeless display of the user experience by the mobile device, the user interface comprising a menu system configured to be:
        initially hidden from view in a user experience; and
        displayed in the user interface in an overlay superimposed over the user experience in response to a menu-based user input being available to the application, the menu system of the user interface including at least one menu item configured for selection to accept the menu-based user input and at least one sub-menu configured for display in response to the selection of the menu item.

2. The method of claim 1, wherein a detected selection of a point outside of the at least one sub-menu causes the at least one sub-menu to be hidden and a top-level menu to be displayed.

3. The method of claim 1, wherein the at least one menu item is selected from a top-level menu configured to act as an access point to one or more sub-menus.

4. The method of claim 3, wherein the top-level menu is hidden and the one or more sub-menus are displayed responsive to a detected selection of the at least one menu item.

5. The method of claim 1, wherein the at least one sub-menu includes selectable indicia configured to provide navigation directly to a top-level menu upon selection of the indicia.

6. The method of claim 5, wherein the menu system is animated such that one or more menu items appear to slide down for display and slide up to be hidden.

7. The method of claim 1, wherein the menu system is animated such that one or more menu items appear to fly off from display within the user interface when hidden.

8. The method of claim 1, wherein the menu system is animated such that one or more menu items appear to shrink while transitioning to a higher level sub-menu or a top-level menu.

9. The method of claim 1, wherein one or more menu items include one or more visual states, the one or more visual states selected from a set comprising: a normal state, a selected state, and a disabled state.

10. The method of claim 1, wherein the at least one menu item is a toggle menu item, the toggle menu item configured to provide two or more selectable options.

11. A mobile device comprising:
   a display; and
   a user interface configured to cause an application programming interface (API) to be generated to expose functionality to an application associated with the API to configure the application for chromeless display of a user experience in which a menu system of the user interface is configured for display in the user interface in an overlay superimposed over the user experience within the user interface in response to a menu-based user input being available to the application, the menu system comprising:
      at least one top-level menu having at least one menu item configured for selection to accept the menu-based user input; and
      at least one sub-menu configured for display in response to the selection of the at least one menu item.

12. The mobile device of claim 11, wherein a detected selection of a point outside of the at least one sub-menu causes the at least one sub-menu to be hidden and the at least one top-level menu to be displayed.

13. The mobile device of claim 11, wherein the at least one top-level menu is hidden and one or more sub-menus are displayed responsive to the selection of the at least one menu item.

14. The mobile device of claim 11, wherein the at least one menu item is a toggle menu item, the toggle menu item configured to provide two or more selectable options.

15. The mobile device of claim 11, wherein the at least one menu item is a toggle menu item, the toggle menu item configured to provide two or more selectable option states for a setting, a current state of the setting identified by indicia within the at least one menu item.

16. The mobile device of claim 11, wherein the at least one menu item is a toggle menu item configured to provide two or more selectable options states for a setting, wherein another submenu is displayed responsive to a selection of the toggle menu item, the other submenu including other menu items corresponding to a plurality of options for the setting, and wherein the other submenu is hidden responsive to a selection of one valid option of the plurality of valid options.

17. The mobile device of claim 11, wherein the menu system is configured for display in the overlay superimposed over the user experience within the user interface in response to the menu-based user input being requested by the application.

18. The mobile device of claim 11, wherein the menu system is dismissed such that menus of the menu system are hidden responsive to menu-based input no longer being available.

19. One or more computer readable storage media having instructions thereon that, upon execution by a computer, cause the computer to perform operations comprising:
   generating, by a user interface of the computer, an application programming interface (API) associated with an application and configured to expose functionality to the application to configure the application for chromeless display of a user experience in which a menu system of the user interface is configured for display in the user interface in an overlay superimposed over the user experience within the user interface in response to a menu-based user input being available to the application, the menu system configured to be:
      initially hidden from view in the user experience; and
      displayed in the overlay superimposed over the user experience in response to the menu-based user input being available to the application, the menu system including at least one menu item configured for selection to accept the menu-based user input and at least one sub-menu configured for display in response to the selection of the menu item.

20. The one or more computer readable storage media of claim 19, wherein a detected selection of a point outside of the at least one sub-menu causes the at least one sub-menu to be hidden and a top-level menu to be displayed.

* * * * *